(12) United States Patent
Nakamoto et al.

(10) Patent No.: US 7,464,336 B2
(45) Date of Patent: Dec. 9, 2008

(54) INFORMATION PROCESSING APPARATUS, IMAGE EDIT APPARATUS, AND CONTROL METHODS THEREOF, AND COMPUTER PROGRAM AND COMPUTER-READABLE STORAGE MEDIUM

(75) Inventors: Hiroshi Nakamoto, Yokosuka (JP); Noriaki Ito, Tokyo (JP); Nobushige Aoki, Yokohama (JP); Yurika Kadoi, Takaoka (JP); Akira Nozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 11/159,104

(22) Filed: Jun. 23, 2005

(65) Prior Publication Data

US 2006/0005159 A1 Jan. 5, 2006

(30) Foreign Application Priority Data

Jun. 29, 2004 (JP) ............................ 2004-191457

(51) Int. Cl.
*G06F 3/00* (2006.01)
(52) U.S. Cl. ..................................................... 715/705
(58) Field of Classification Search ........................ None
See application file for complete search history.

(56) References Cited

U.S. PATENT DOCUMENTS

| | | | | | |
|---|---|---|---|---|---|
| 4,559,614 | A | * | 12/1985 | Peek et al. | 718/100 |
| 5,287,444 | A | * | 2/1994 | Enescu et al. | 715/507 |
| 6,717,589 | B1 | * | 4/2004 | Grillo et al. | 715/715 |
| 6,750,878 | B1 | * | 6/2004 | Tatsuo et al. | 715/705 |
| 6,862,599 | B2 | * | 3/2005 | King | 707/100 |
| 2002/0003956 | A1 | * | 1/2002 | Inagaki | 396/89 |
| 2002/0047869 | A1 | * | 4/2002 | Takiguchi | 345/838 |
| 2002/0180772 | A1 | * | 12/2002 | Fado et al. | 345/709 |
| 2003/0001875 | A1 | * | 1/2003 | Black et al. | 345/708 |
| 2003/0222898 | A1 | * | 12/2003 | Macomber et al. | 345/709 |

(Continued)

FOREIGN PATENT DOCUMENTS

JP 2000-196850 7/2000

(Continued)

OTHER PUBLICATIONS

Author: Simsic et al., Title: "The No Nonsense Guide to Photoshop Elements 2", Date: 2003, Publisher: Brandon A. Nordin, pp. 15-17 & 172-175.*

(Continued)

*Primary Examiner*—Kee M Tung
*Assistant Examiner*—David H Chu
(74) *Attorney, Agent, or Firm*—Fitzpatrick, Cella, Harper & Scinto

(57) ABSTRACT

This invention prevents ballooning of the amount of comment information while being applied to an operation environment of the user, and provides comment information associated with an intuitively plain operation in a way that is particularly easy for a user. To this end, upon launching of an application, a window including processing buttons and a message area is displayed. Immediately after display, bitmap data of that window is acquired (self-captured), and the acquired bitmap data is displayed in a reference image display area of the window after being scaled down. Arrow lines which specify correspondence between comments in a message area and the buttons in the reference image display area are displayed.

12 Claims, 11 Drawing Sheets

U.S. PATENT DOCUMENTS

| | | | |
|---|---|---|---|
| 2004/0073873 A1* | 4/2004 | Croney et al. | 715/526 |
| 2004/0169672 A1* | 9/2004 | Misumi | 345/700 |
| 2004/0242265 A1* | 12/2004 | Kawamura | 455/550.1 |
| 2005/0083350 A1* | 4/2005 | Battles | 345/660 |
| 2005/0138559 A1* | 6/2005 | Santos-Gomez et al. | 715/709 |
| 2005/0268234 A1* | 12/2005 | Rossi et al. | 715/705 |
| 2006/0112333 A1* | 5/2006 | Iwanaga | 715/531 |
| 2007/0157102 A1* | 7/2007 | Hasegawa et al. | 715/769 |

FOREIGN PATENT DOCUMENTS

| | | |
|---|---|---|
| JP | 2000-330683 | 11/2000 |

OTHER PUBLICATIONS

"Learning Carbon" Chapter 12 Help; p. 273, Ohmsha, Ltd., (the first impression of the first edition, Dec. 27, 2001).

* cited by examiner

F I G. 10
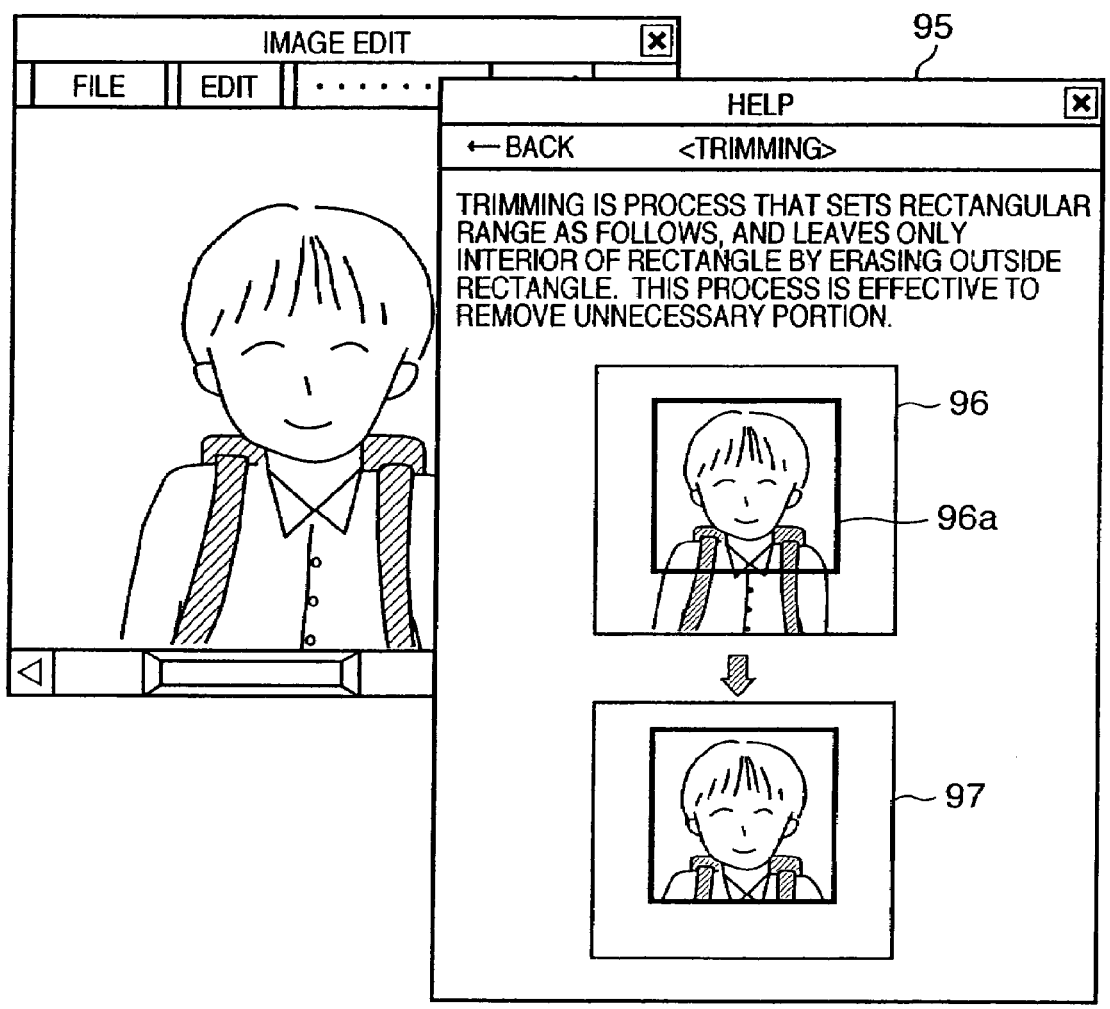

INFORMATION PROCESSING APPARATUS, IMAGE EDIT APPARATUS, AND CONTROL METHODS THEREOF, AND COMPUTER PROGRAM AND COMPUTER-READABLE STORAGE MEDIUM

BACKGROUND OF THE INVENTION

Field of the Invention

The present invention relates to a graphical user interface technique.

Along with the improvement of the arithmetic processing performance of computers, operating systems (to be referred to as an "OS" hereinafter) having a graphical user interface (GUI) in place of a character-based user interface (CUI), and application programs which run on such OS, have been observed to continue in use long after their appearance in the marketplace.

Since applications for the GUIs of recent personal computers (to be referred to as "PCs" hereinafter) display various buttons, icons, and pull-down menus (to be generally referred to as "controls" hereinafter), unlike the CUI, it is easy to visually and intuitively recognize the operation contents with GUIs.

For example, a simple character string or mark (symbol) is displayed on each displayed button, so as to inform the user of the contents of the processing to be executed upon operation of that button.

However, even when a character string or mark is displayed on each button, it is difficult to recognize the correspondence between the buttons and their processing contents at the beginning of use of an application program. Especially, when there are many controls such as buttons and the like, the tendency for such confusion to occur is strong.

For this reason, an application program normally adopts a help system that gives comments on the use of that application (for example, see "Learning Carbon" (Chapter 12 Help; p. 273), Ohmsha, Ltd. (the first impression of the first edition, Dec. 27, 2001)).

The help system is launched from a predetermined menu of the application, and various display forms of help systems such as keyword search, hierarchical display by processing items, and the like are available.

Also, a technique that stores the user's operation history, and displays help information according to the stored history (e.g., Japanese Patent Laid-Open No. 2000-330683) is known, as is a technique of a help system which can register target application programs and can cope with general-purpose applications (e.g., Japanese Patent Laid-Open No. 2000-196850).

Furthermore, like Help Center of "OS 9" provided by Apple Computer, Inc., a technique which provides a comment message about a given control in a "balloon" form when the user moves a cursor that cooperates with a pointing device to that control is available.

The conventional help system can provide a hint about what to do upon executing target processing, and can inform the user of comment information about the meaning of a control of interest. However, with increasing complexity/functions in a GUI application program, the size of the program file (including the program code file and the data file) of the help system is growing. Also, PCs in use vary widely in their hardware resources, and it is impossible for an application program whose processes change depending on the hardware resources of the PC on which the application is running, to configure help systems for the individuals using the various PCs.

Moreover, the conventional help system is prepared by an application vendor, and is created independently of data to be manipulated by the users. Hence, the conventional help system is no better than message outputs arranged in advance on a kind of greatest common denominator basis.

SUMMARY OF THE INVENTION

It is an object of the present invention to provide a technique which can prevent the ballooning of the quantity of comment information while being applied to the particular operation environment of the user, and which can give comment information associated with an intuitively plain operation.

In order to achieve the above object, for example, an information processing apparatus of the present invention comprises the following arrangement. That is, an information processing apparatus which lays out selectable processing items in a display window, and executes a corresponding process when one of the processing items is designated by a predetermined instruction, comprises:

acquisition means for, when the display window is displayed, acquiring display image data which forms the display window; and display control means for displaying the acquired image data and comments of the processing items in association with each other together with the display window.

Also, an image edit apparatus to which the present invention is applied comprises the following arrangement. That is, an image edit apparatus which displays an image, and edits the displayed image by selecting a desired image process item, comprises:

determination means for determining if an instruction of a comment display of a processing item associated with an image edit process is input;

acquisition means for, when the determination means determines that the instruction of the comment display is input, acquiring displayed image data to be edited; and comment display means for setting the acquired image as a pre-edit image and a result obtained by applying an image process of the processing item corresponding to the comment display request as a post-edit image, and displaying the pre-edit image and the post-edit image together with a comment of the processing item corresponding to the comment display request.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows an example of a help window according to the embodiment of FIG. 1.

DETAILED DESCRIPTION OF THE PREFERRED EMBODIMENTS

Preferred embodiments of the present invention will be described in detail hereinafter with reference to the accompanying drawings.

Figure 1:
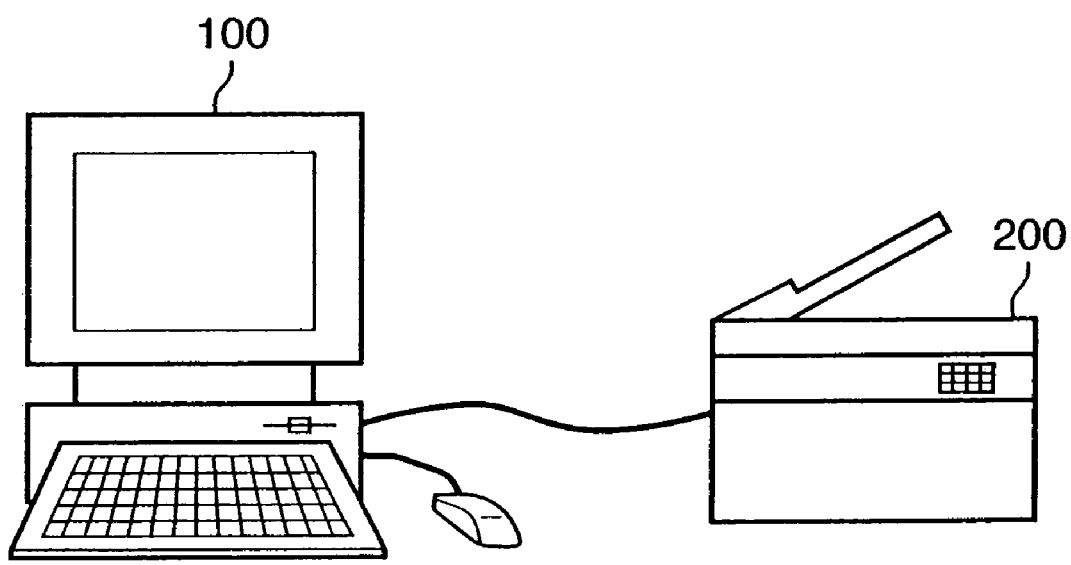
FIG. 1 is a view showing the system arrangement according to an embodiment of the present invention.

FIG. 1 shows the system arrangement according to an embodiment of the present invention. Referring to FIG. 1, reference numeral 100 denotes a PC; and 200, a Multi-Function Peripheral (to be abbreviated as "MFP" hereinafter) having an image scanner function, printer function, FAX function, and copy function. The PC 100 and MFP 200 are connected via a two-way communication interface (e.g., a USB interface).

Figure 2:
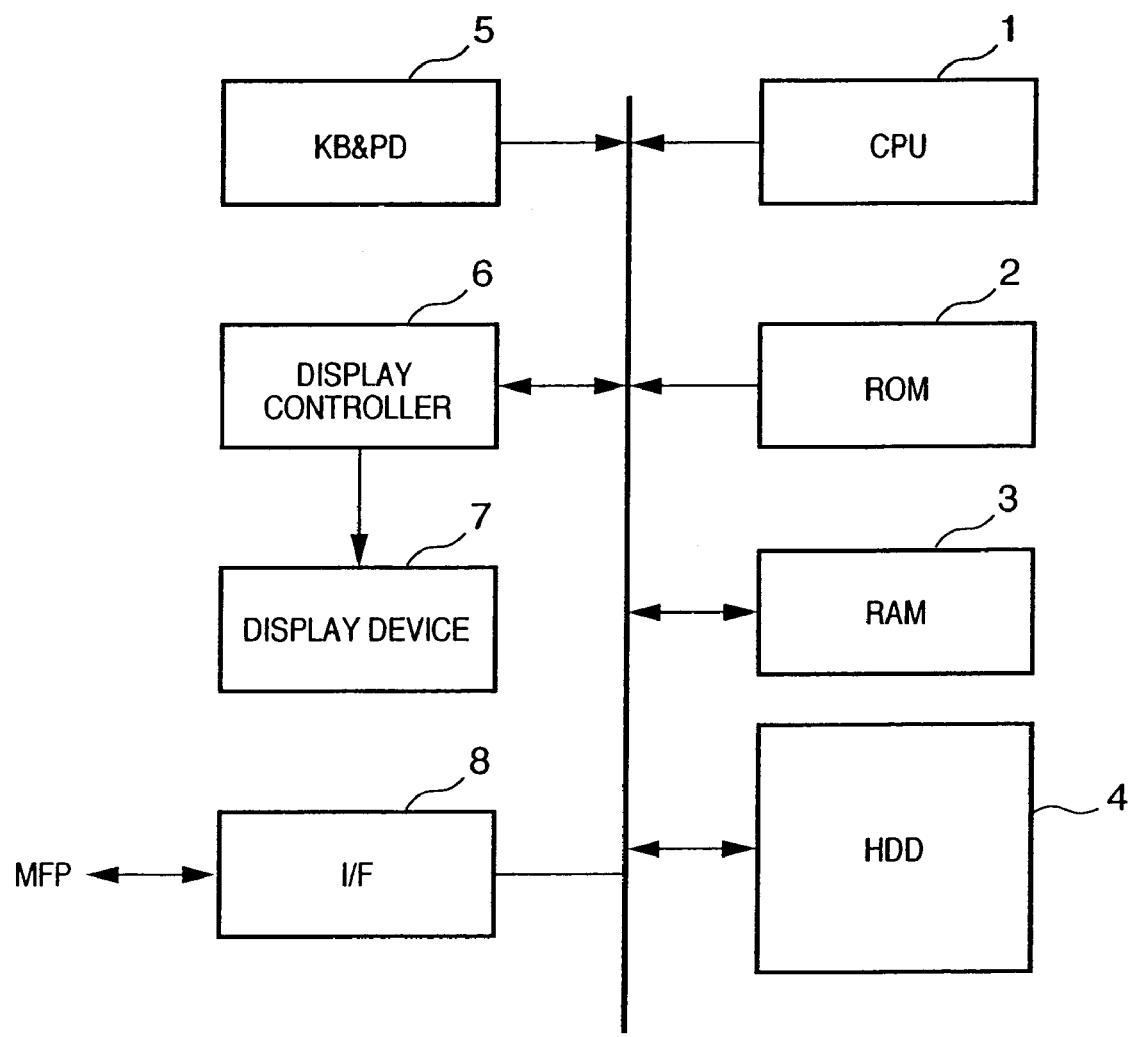
FIG. 2 is a block diagram showing the arrangement of a PC 100 according to the embodiment of FIG. 1.

FIG. 2 is a block diagram of the PC 100. Referring to FIG. 2, reference numeral 1 denotes a CPU which controls the overall PC; 2, a ROM which stores a BIOS and boot program; and 3, a RAM used as a work area of the CPU 1. Reference numeral 4 denotes a hard disk which can store an application program (including a help program) of this embodiment, and various data files. Reference numeral 5 denotes a keyboard (KB) and a pointing device such as a mouse(R) or the like. Reference numeral 6 denotes a display controller which comprises a video memory, and a controller that executes rendering processing of data and outputs rendered data as a video signal to the video memory under the control of the CPU 1. Reference numeral 7 denotes a display device which displays an image on the basis of a video signal output from the display controller 6. Reference numeral 8 denotes an interface (USB in this embodiment) which allows two-way communications with the MFP 200.

With the above arrangement, when the power switch of the PC 100 is turned on, the CPU 1 executes the boot program stored in the ROM 2, and loads and launches the OS from the HDD 4 onto the RAM 3, After that, when a designation input of an application of this embodiment is issued, that application program is loaded onto the RAM 3, and executes various kinds of processing using the MFP 200.

Assume that Windows(R) provided by Microsoft Corporation will be exemplified as the OS of this embodiment. Also, a utility application program which stores and manages images input from the MFP 200 in the HDD 4 in the form of an album, and prints these images will be exemplified as the application program of this embodiment.

Figure 3:
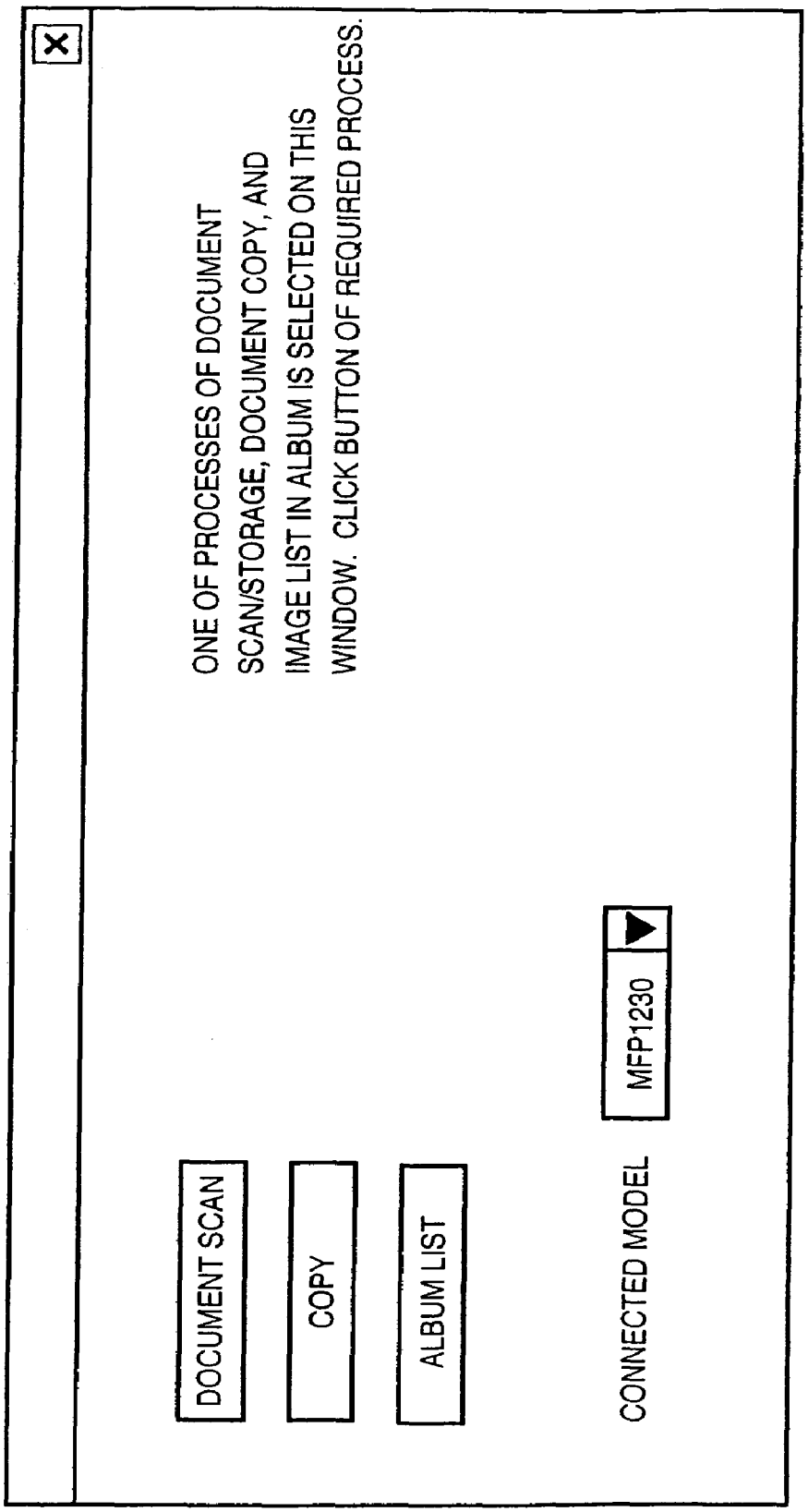
FIG. 3 shows an example of a GUI window of a normal application.

When images are stored and are printed as needed, it is a common practice to display a GUI window having buttons corresponding to respective functions. FIG. 3 shows a typical example of such GUI window.

In FIG. 3, there are three buttons to be processed, and character strings "document scan", "copy", and "album list" are superimposed on these buttons. As a model name indicated at the lowermost position, the type of MFP that is connected to the PC is selected in a combo box format. Also, the right-hand area of this window displays a simple message indicating the contents to do on this window.

When the "document scan" button is clicked, the current window is switched to a GUI window for a document scan mode (not shown) (i.e., the control shifts to document scan processing), a process for scanning documents set on the MFP 200, and storing their images in an album (a folder which is stored on the HDD 4 and is managed by this application) is executed.

Upon clicking the "copy" button, the control shifts to a process for scanning a document, and printing a copy thereof on a print sheet. Upon clicking the "album list" button, the control shifts to a process for displaying a list of images which have been previously registered in the album.

In practice, various menu items line up on the window top of FIG. 3, and there are many items to be operated. Hence, a user who is unused to a computer, or a person who is a beginner with computers, often cannot recognize the presence of such "buttons". In some cases, when the user wants to "scan documents and store their images in the PC" in an environment in which many menu items and buttons are displayed, the user does not realize that he or she need only operate the "document scan" button.

Figure 4:
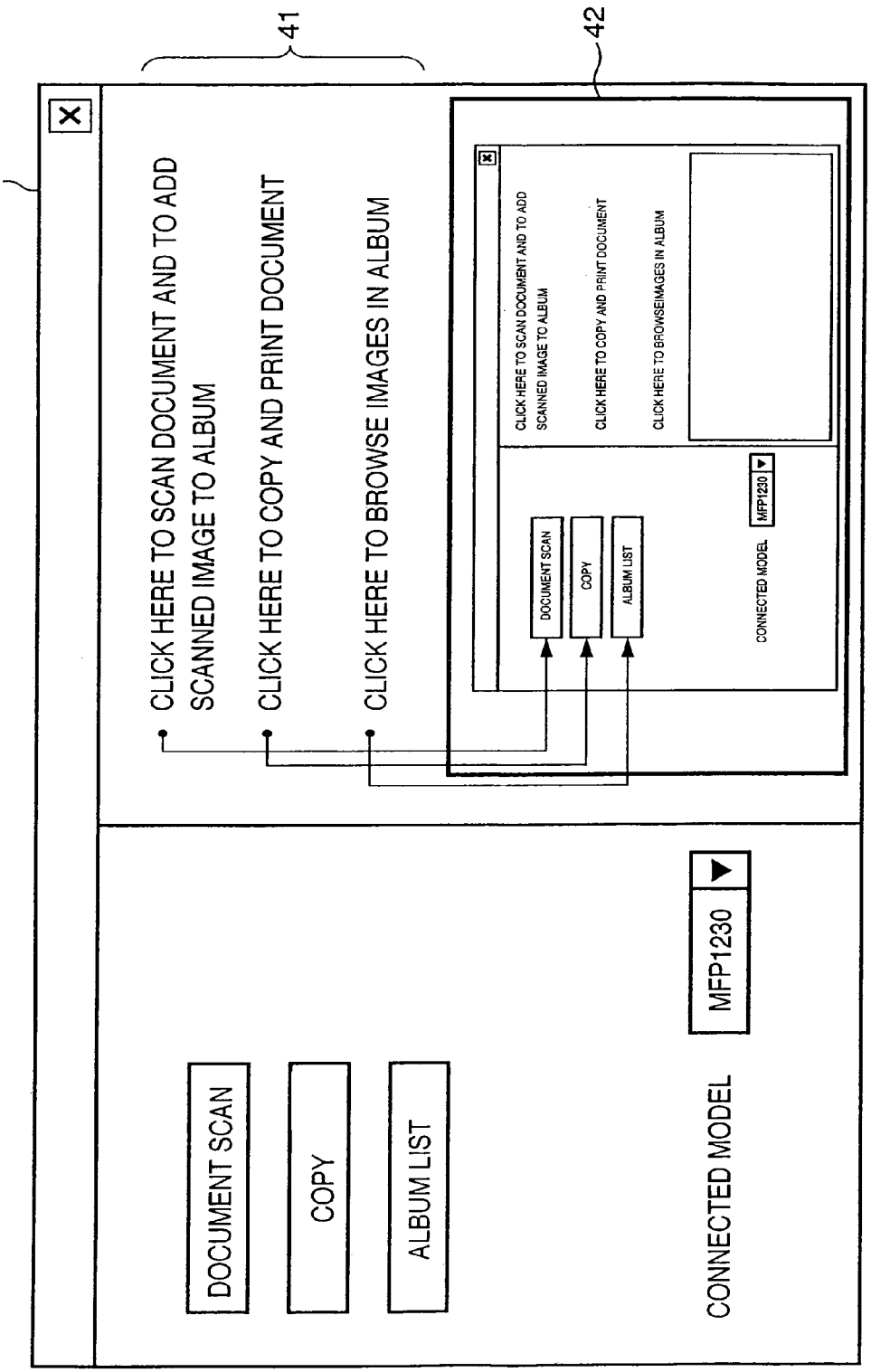
FIG. 4 shows an example of a GUI window according to the embodiment of FIG. 1.

The present inventors have hit on the idea that the GUI window shown in FIG. 4 is displayed in place of that in FIG. 3, in consideration of the above situation.

On a GUI window 40 shown in FIG. 4, three buttons at the left side are substantially the same as those in FIG. 3. Differences are that a message display area 41 for displaying detailed messages of individual buttons, and a reference image display area 42 for displaying a scale-down image of the window 40, are provided, and scale-down buttons displayed in the reference image display area 42 are coupled to the corresponding messages via arrows (line segments).

Since the buttons and messages indicating the processing contents upon clicking these buttons are displayed in correspondence with each other, the user can more easily recognize the processing that will be initiated by clicking each respective button displayed on the window.

Note that "MFP1230" is selected in a combo box associated with the connected model at the lower left position on the window 40. In addition, a message corresponding to this portion may be displayed on the message display area.

Figure 5:
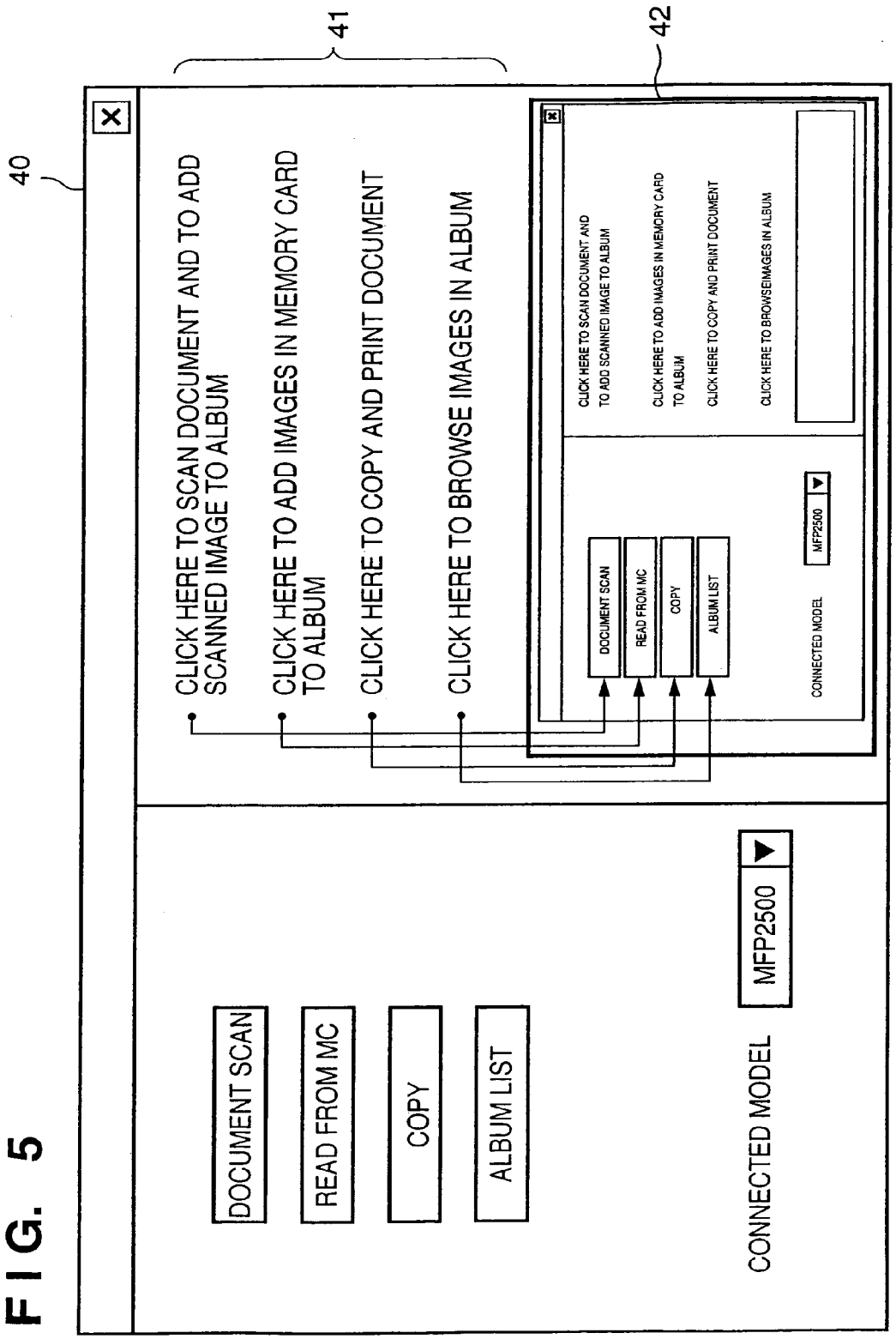
FIG. 5 shows another example of a GUI window according to the embodiment of FIG. 1.

When a model that can receive a memory card which stores images sensed by a digital still camera or the like is selected as the connected MFP, since means for inputting images include means for reading images from the memory card in addition to the means for scanning documents, a window 40 shown in FIG. 5 is displayed in place of FIG. 4.

In FIG. 5, a "read from MC" button is added, and there are four buttons to be operated. A comment associated with the "read from MC" button is added to the message display area 41, and the scaled-down image of the window shown in FIG. 5 is displayed on the reference image display area 42. In addition, the button images in the scaled-down image and messages are displayed in correspondence with each other via arrow lines.

That is, as can be easily understood from FIGS. 4 and 5, the number of buttons to be displayed, and the contents displayed on the message display area 41 and reference image display area 42, depend on the connected model.

Upon displaying the GUI window, as shown in FIG. 4 or 5, the user can intuitively recognize the button (or menu item) to be operated more easily than with FIG. 3. For the GUI window 40, a common window can be used independently of the type of MFP that is connected. Since the buttons on the left side of the window are displayed by requesting a standard button display prepared by the OS, they require only a small amount of information. On the other hand, character strings displayed on the message display area need only be held as character code groups depending on models, and their information size also can be reduced. Also, the arrow lines can be held as vector data, and require only a small amount of information.

The problem lies in the scaled-down image displayed on the reference image display area 42. Even the scaled-down image preferably has the same display color as the window 40 to be operated by the user, and the amount of information ("information size") required for this portion is incommensurably larger than other information sizes. Since recent OSs using the GUI can change the display pattern (color, appearance) of the window to be displayed using a technique called a desktop theme, a huge information size is required to prepare scaled-down images in correspondence with individual cases.

In order to solve the above problem, the present inventors can display the GUI window 40 shown in FIGS. 4 and 5 by executing the following processes.

Procedure 1. The window 40 is displayed while leaving the reference image display area 42 blank. At this time, messages displayed on the message display area 41 depend on the previously selected model name.

Procedure 2. The displayed window 40 is self-captured. Note that self-capturing is a process for acquiring bitmap image data of the displayed window 40. The application can acquire its window size and position by utilizing the function call of the OS. A bitmap image of the corresponding rectangular area of the video memory of the display controller 6 can be acquired based on this information. Since the OS which runs on the PC 100 of this embodiment is Windows(R), a bitmap image of its own window 40 can be acquired using an API (a process executed when the "PrintScreen" key is pressed whole holding down the "Alt" key).

Procedure 3. The acquired image data of the window 40 undergoes a scale-down process to fall within the size of the reference image display area 42. Thus, the scale-down process can be implemented by decimation of pixels.

Procedure 4. The scaled-down window image is displayed within the reference image display area, and arrow lines indicating the contents of the message display area and scaled-down images are displayed on the basis of the information depending on the selected model.

The processings involved in procedures 2 to 4 above are done instantaneously since the recent CPU 1 has a high processing speed. That is, the user hardly feels odd since it looks as if the scaled-down version of the window were displayed on the reference image display area 42 simultaneously with display of the window 40, as shown in FIG. 4 or 5. When the connected model name is changed in FIG. 4 or 5, procedures 1 to 4 are executed according to the changed model name. Depending on the OS, upon requesting window rendering, a parameter associated with a visible/invisible property of that window may be set to be invisible during rendering. In this case, the window in procedure 1 may be displayed under such setting, and the parameter may be set to be "visible" after image data is finally formed in procedure 4.

Upon clicking the "document scan" button in FIG. 4 or 5, another window is displayed to execute a "document scan" operation. The same processings are applied to the window displayed at that time.

DETAILED DESCRIPTION

The structure and operation of the application program of this embodiment will be described below.

As shown in FIG. 4 or 5, buttons and messages to be displayed on the GUI window (also a root window) of the application of this embodiment change depending on the model of the connected MFP. However, buttons to be displayed can be prepared in a greatest common denominator manner, and the number of buttons and messages to be displayed on a new window (sub-window) displayed upon clicking each individual button differ depending on the models, but the items to be processed remain the same. For example, upon clicking the "document scan" button, a GUI window used to setting a scan resolution and the like is displayed. However, since the resolutions to be selected differ depending on models, their menus are different. Also, MFPs with/without an ADF (Auto Document Feeder) often have different window contents.

Hence, in this embodiment, files having information associated with GUI windows are prepared for respective MFPs that can be connected, and are specified by a model name selected from the model name combo box on the GUI window in FIG. 4 or 5.

Figure 6:
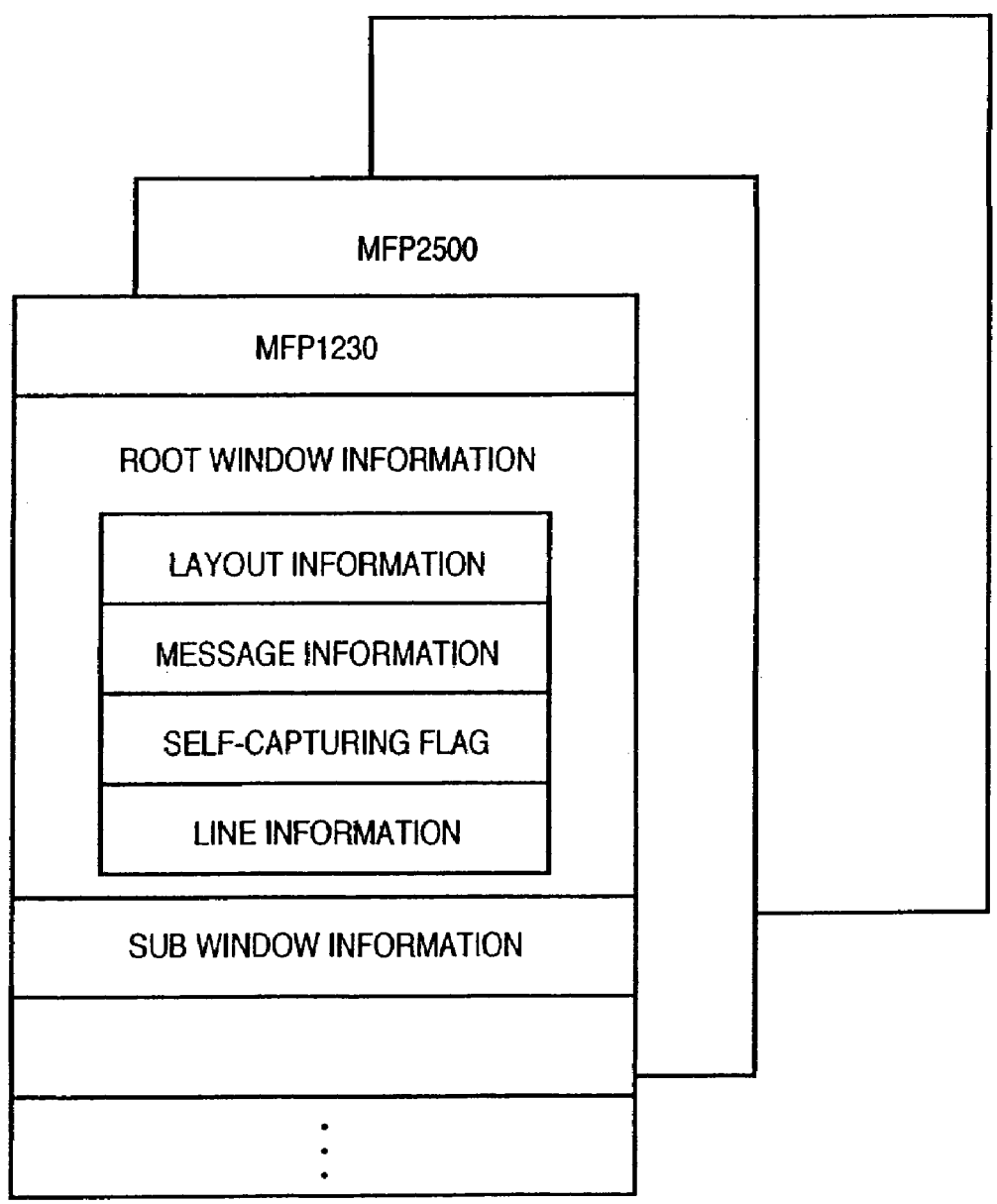
FIG. 6 shows the structures of GUI window information files for respective Multi Function Peripherals that can be connected according to the embodiment of FIG. 1.

FIG. 6 shows the structures of GUI window files for respective MFPs. As shown in FIG. 6, one file includes root window information and sub-window information (a plurality of pieces of sub-window information can be included) located at a lower layer. Each window information (FIG. 6 exemplifies only the root window, but the same applies to the sub-window information) includes information that defines the hierarchical structure of windows (if a window is present as an upper layer of the window of interest, a pointer to that window information; if at least one window is present as a lower layer of the window of interest, a pointer to that window information). In addition, as shown in FIG. 6, the window information includes layout information that defines the buttons, menus, message display area, reference image display area, and the like, message information to be displayed on the message display area 41 in the window, a self-capturing flag indicating whether or not self-capturing is required upon displaying the window of interest, and line segment information required to draw arrows which associate the message display area 41 and reference image display area 42 when the message display area 41 is displayed. When the self-capturing flag is OFF, the line segment information is not required. Also, no image data to be displayed in the reference image display area 42 is included, as described above.

Figure 7:
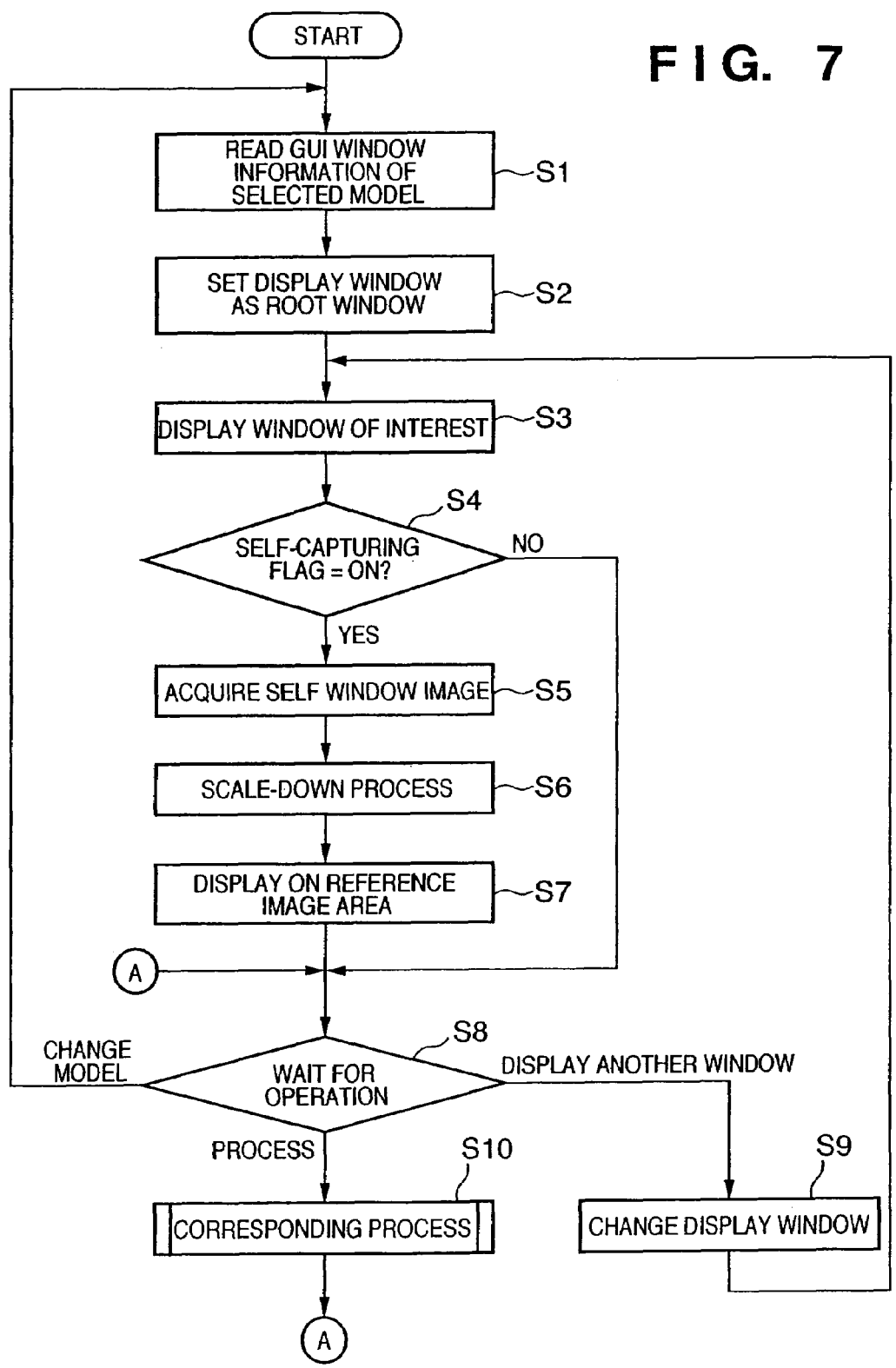
FIG. 7 is a flowchart showing the processing contents according to the embodiment of FIG. 1.

The processing operation of the application program of this embodiment will be described below with reference to the flowchart of FIG. 7.

When the application program is launched, the GUI window file of the previously selected MFP is read in step S1. Note that information indicating the previously selected MFP is saved as an independent file upon selecting the model. In this embodiment, since Windows(R) has been exemplified as the OS, such information can be registered in a registry or the like.

The flow advances to step S2, and a root window is set as an object to be displayed so as to display a default window. As a result, since the window to be displayed is determined, the flow advances to step S3, and the GUI window 40 (see FIG. 4 or 5) is displayed on the basis of the corresponding window information in the file of the selected model.

It is then checked in step S4 if the self-capturing flag of the window of interest is ON. If the self-capturing flag is ON, the flow advances to step S5 to execute a process for acquiring image data of the displayed window (self-capturing process). The acquired window image undergoes a scale-down process to fall within the reference image display area 42 in step S6, and is displayed on the reference image display area 42 in step S7.

After that, the control waits for a user's instruction input in step S8.

If it is determined in FIG. 4 or 5 that the connected model has been changed, the flow returns to step S1 to read the window information file of the selected model.

On the other hand, if a displayed menu or button is clicked, one of two different processes is executed. That is, one instruction is that for displaying another window, and the other instruction is that for starting the process (print start instruction or the like). These distinctions comply with respective buttons and menu items.

If it is determined that the other window display instruction (a shift instruction to a sub-window) is input, a setting is made to display the corresponding window in step S9, and the processes in step S3 and subsequent steps are executed. Of course, if the "self-capturing flag" in that sub-window information is ON, the process for acquiring and displaying the self window image is executed.

On the other hand, if it is determined that the processing start instruction is input, the corresponding process is executed in step S10.

As described above, according to this embodiment, upon displaying an application window, image data of the application window is acquired, and the correspondence between the acquired image and items (buttons, menus) that can be operated by the user is presented, thus providing a user interface that can be easily understood by the user. Even when the types of hardware resources (MFPs in this embodiment), desktop themes, and the like are different for respective users, the self-capturing result of a self window image according to the hardware resources and desktop theme can provide information that supports the user's operation. Hence, window images need not be prepared for individual hardware resources, and the application program size can be kept from increasing.

Figure 8:
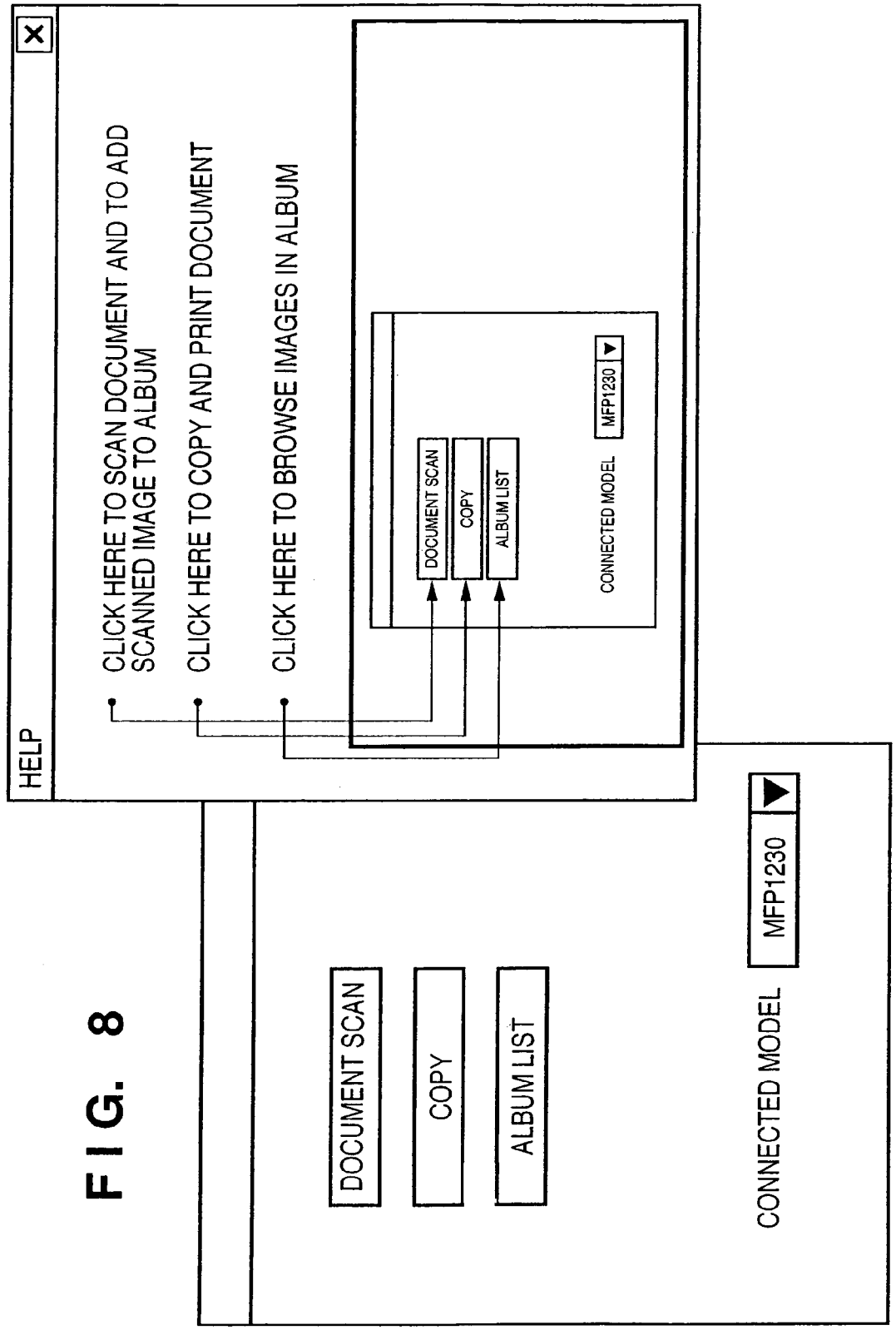
FIG. 8 shows a modification of a GUI window of an application according to the embodiment of FIG. 1.

FIGS. 4 and 5 have exemplified a case wherein the window having processing buttons of the application includes support information of the message display area 41 and reference image display area 42. Alternatively, as shown in FIG. 8, such support information may be displayed on a window independent of the application window.

An image edit process of this embodiment will be described below. This process is executed when the "album list" button is clicked on the window of FIG. 4 (or FIG. 5) and an image edit menu is selected on a window used to display a list.

Figure 9:
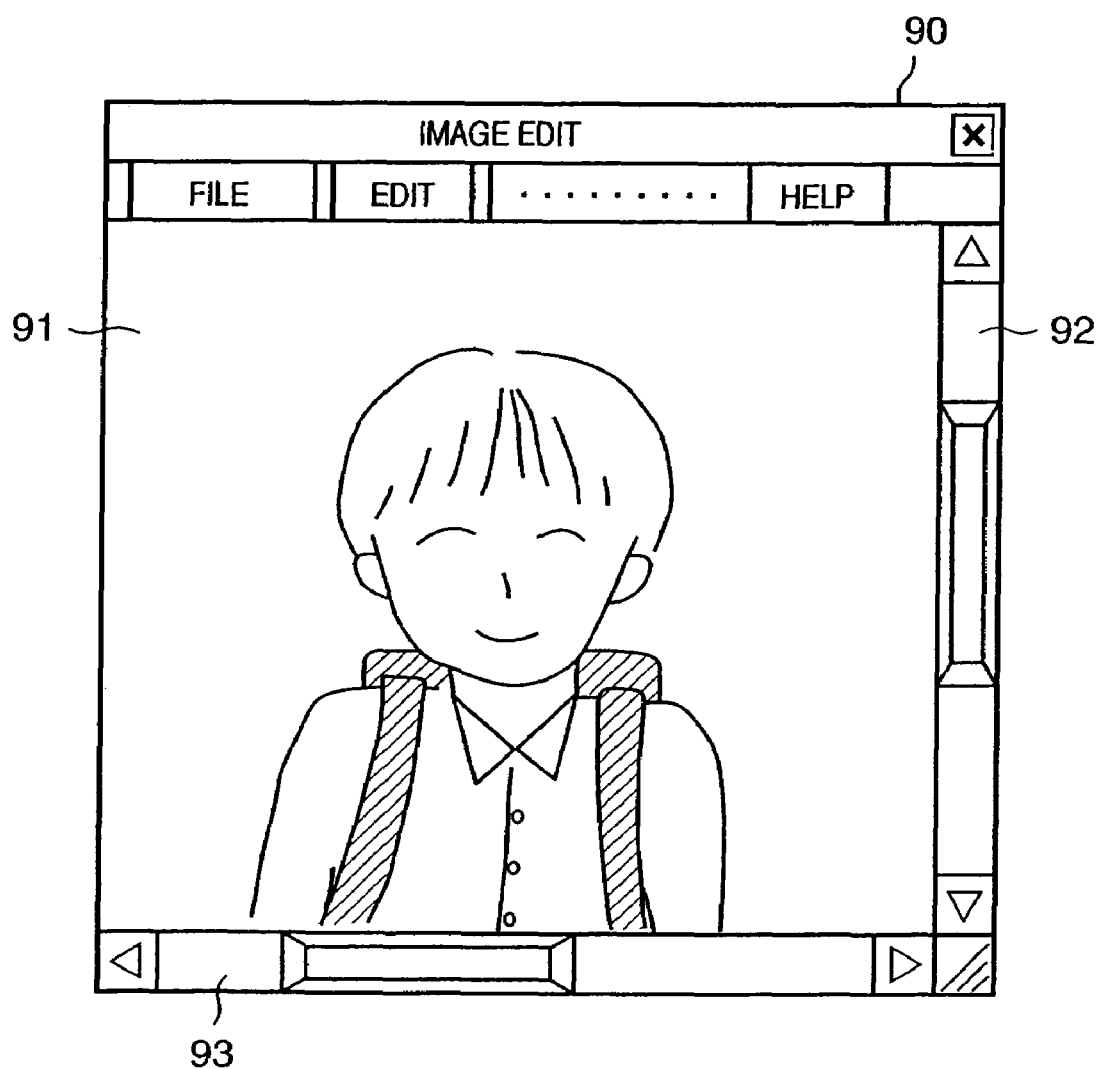
FIG. 9 shows an example of an image edit window according to the embodiment of FIG. 1.

FIG. 9 shows an image edit window 90 of this embodiment. As shown in FIG. 9, menus such as "file", "edit", . . . , "help", and the like are prepared in a menu bar as in a general image edit application. "File" in the menu bar is a pull-down menu which can issue an image save instruction after edit, print instruction, and read instruction. Also, "edit" is a pull-down menu which can select various image processes. "Help" is a pull-down menu, which displays items such as the version, comments of respective image processes, and the like.

An image display area 91 displays an image designated (selected) by the user. When the image size exceeds the window size, a desired area can be displayed by operating scroll bars 92 and 93. Also, the window size may be changed.

The image edit window 90 shown in FIG. 9 is the same as that displayed by a normal image edit application. A feature of this embodiment lies in the process executed when the user selects "help"→"comment of image process" on the image edit window 90 in FIG. 9.

As image edit processes, trimming, color conversion (monotone conversion), rotation, filter processes associated with softening and sharpness, and various special effects are known. It is difficult for the beginner to recognize some of the terms and meanings used in these image edit processes. Therefore, a help system that gives comments on various terms is normally prepared in an application program, but merely gives comments in the form of sentences.

The application of this embodiment gives comments on various image processes using an image which is read as an object to be edited by the user in practice.

In FIG. 9, when the user clicks "help"→"comment of image process" in the menu bar, a help window which displays a list of image processes that can be used in this application is displayed. When the user selects (clicks) one of these image processes, a comment about the selected image process is displayed. Note that an item that the user wants to know may be found by a search process in place of displaying the technical term list.

FIG. 10 shows a window display example when the term "trimming" of the image process is designated. In FIG. 10, reference numeral 95 denotes a help window.

As shown in FIG. 10, information indicating a comment about trimming, and a sentence indicating its process are displayed on the upper portion of the help window 95, and an actual example of that process is displayed using the image designated (selected) by the user from the middle to the lower portions of the help window 95.

An object to be displayed upon displaying the actual example of the image process is an image in the image display area 91 in the self-captured window in place of the entire self-captured window. This is because the user wants to know the meaning of "trimming" in this case, and comments on other processing items are not currently required. In addition, when the actual example is presented within the limited space, it is more effective to preferentially display an image to be edited in place of displaying the entire window.

Since the application program can acquire the display size of the self window from the OS, and the number of menus and the like are known, it is apparent that it can determine the location of the image display area 91. An area slightly inside the image display area 91 may be captured in place of just a circumscribed rectangle of the image display area 91.

Upon displaying the actual example, for an image process such as trimming or the like, which requires area designation, target area information of a pre-edit image display area 96 (e.g., an area having the same center as the pre-edit image display area 96 and the height and width 80% of the area 96) is stored as needed, a line segment 96*a* indicating that area is displayed, and the result of the selected image process within the line segment 96*a* is displayed in a processing result display area (or post-edit image display area) 97. As for an image process that does not require any area designation, no line segment 96*a* is displayed, and an actual processing result of an image in the pre-edit image display area 96 can be displayed in the processing result display area 97.

Figure 11:
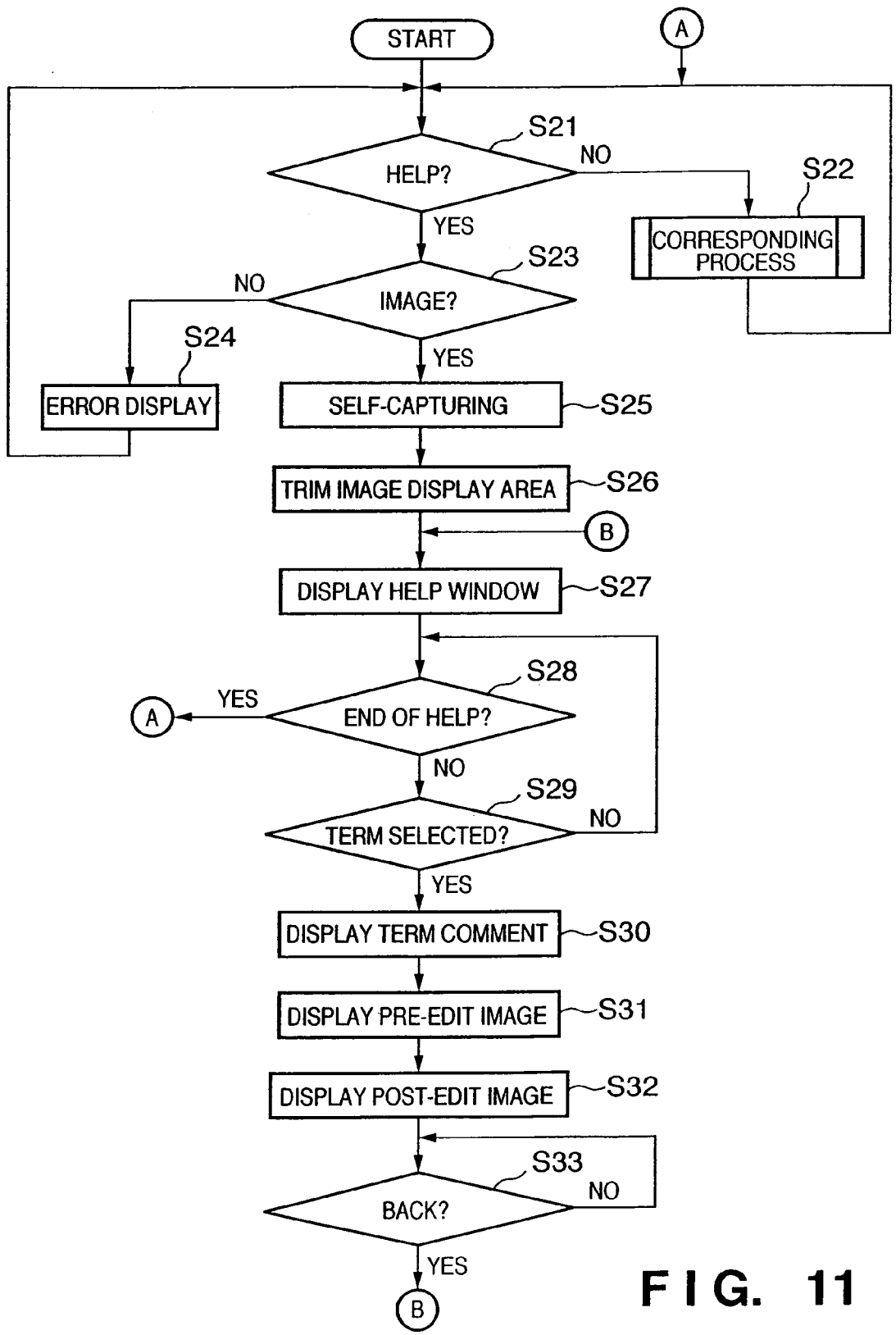
FIG. 11 is a flowchart showing the processing contents upon displaying the image edit window according to the embodiment of FIG. 1.

The process after the image edit window 90 of this embodiment is displayed will be described below with reference to the flowchart of FIG. 11.

In step S21, the user's instruction contents are checked. If it is determined that the instruction contents are other than a help, a corresponding process (a read, save, print, actual image edit process, or the like of an image) is executed in step S22.

On the other hand, if the help of the glossary is designated, a check is made in step S23 to see if an image to be edited is read onto the image display area 91. If NO in step S23, the flow advances to step S24 to display a message "read an image to be edited since this application gives a comment using an actually read image" or the like. Then, the flow returns to step S21.

If it is determined that the image to be edited is read, the edit window 90 is self-captured in step S25, is trimmed to leave only the image display area 91 and is temporarily saved in the RAM 3 in step S26. In step S27, the help window 95 which allows the user to select the list of image processings is displayed. A check is made in steps S28 and S29 as to whether if a help process end instruction is issued, and if one of the image processings is selected. If the help process end instruction is issued, this process ends. On the other hand, if one of the image processings is selected, the flow advances to step S30 to display a comment part of the selected image process on the help window 95, and to display the image temporarily saved in the RAM 3 on the pre-edit image display area 96. At this time, in the case of an image processing that requires area designation, since a predetermined area in the pre-edit image display area 96 is designated in advance, that area is displayed with a line segment bounding it.

Next, the image processing selected by the user is applied to the image in the area set in step S32, and the processing result is displayed on the post-edit image display area 97. As a result, if "trimming" is designated as the image processing, the display shown in FIG. 10 can be made. In step S33, the control waits for designation (clicking) of "back" on the window shown in FIG. 10.

If "back" is designated, since the flow returns to step S27, i.e., to the select window for selecting processing items, the user can designate another type of image processing. In this case, a comment on another image processing can be given on the basis of the self-captured image (image in the image display area 91), which is temporarily stored in the RAM 3.

As described above, according to this embodiment, a comment about actual processing contents can be given on the comment (help) window of various image processings, taking an image which is displayed by the user on the image edit window 90 as an object to be edited as an example. Hence, the user can receive a comment about an image actually of interest to him or her, and can easily understand the nature of the image processing in question. Since the programmer of this application need not prepare a help system with images, the program and data size of that help system can be greatly reduced.

The preferred embodiment according to the present invention has been described. A characteristic feature of the present invention lies in a computer program. In general, a computer program is stored in a computer-readable storage medium such as a CD-ROM or the like, and is ready to run after the computer-readable storage medium is set in an apparatus, and the computer program is copied or installed in a system. Hence, such computer-readable storage medium is also included in the scope of the present invention, as a matter of course.

This embodiment has been described with reference to an application program using the MFP. However, the present invention is not limited to such specific application.

As described above, according to the present invention, when a window including processing items is displayed, display image data which forms that display window is acquired, and the acquired image data and comments about the respective processing items are displayed together with the display window in association with each other. Hence, a comment about the actually displayed display window can be given.

According to another aspect of the invention, when a comment about a processing item associated with an image edit processing is to be given, image data displayed as an object to be edited is acquired, the acquired image is displayed as a pre-edit image, the result obtained by applying the type of image processing in question is displayed as a post-edit image, and a comment about the processing item corresponding to the comment display request is displayed together with these images. Hence, a comment can be given using the user's interesting image, without the information size required for the process for giving a comment using the image increasing hugely.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-191457 filed on Jun. 29, 2004, which is hereby incorporated by reference herein.

What is claimed is:

1. An information processing apparatus which lays out selectable processing items in a display window, and executes a corresponding process when one of the processing items is designated by a predetermined instruction, the apparatus comprising:

display means for displaying video output;

display controller means for generating video signals that are provided to said display means;

window display means for controlling said display controller means to display an original display window in which selectable items, comments for the items, and a reference image display area are arranged;

acquisition means for acquiring, from said display controller means, bitmap image data of a screen copy image of the currently displayed original display window;

reduction means for reducing the size of the bitmap image data acquired by said acquisition means; and generation updating means for updating the displayed original window by arranging the image reduced by said reduction means within the reference image display area of the displayed original display window and drawing arrow lines connecting items in the reduced selectable items in the reduced image and comments in the displayed original display window.

2. The apparatus according to claim 1, further comprising:

designation means for designating a type of an external device connected to said apparatus; and change means for changing the selectable items and comments for the items on the displayed original display window in accordance with the type of the external apparatus designated by said designation means, wherein said acquisition means also performs acquisition when said change means changes the selectable items and comments for the items.

3. The apparatus according to claim 1, further comprising:
determination means for determining whether or not the image of the original display window should be acquired on the basis of flag information indicating whether or not original display window is self-captured,
wherein said acquisition acquires bitmap image data of a screen copy image of the original window if said determination means determines that the image of the original display window should be acquired.

4. A method of controlling an information processing apparatus having a display controller generating video signals provided to a display device which displays video on a screen, which lays out selectable processing items in a display window, and which executes a corresponding process when one of the processing items is designated by a predetermined instruction, the method comprising:
a window display step of controlling the display controller to display an original display window in which selectable items, comments for the items, and a reference image display area are arranged;
an acquisition step of acquiring, from the display controller, bitmap image data of a screen copy image of the currently displayed original display window;
a reduction step of reducing the size of the bitmap image data acquired in said acquisition step; and
a generation step of updating the displayed original window by arranging the image reduced in said reduction step within the reference image display area of the displayed original display window and drawing arrow lines connecting items in the reduced selectable items in the reduced image and comments in the displayed original display window.

5. A computer-readable medium storing a computer program in executable form, which serves as an information processing apparatus having a display controller generating video signals provided to a display device which displays video on a screen, which lays out selectable processing items in a display window, and which executes a corresponding process when one of the processing items is designated by a predetermined instruction, when said program is loaded and executed by a computer, the computer program comprising:
window display means for controlling the display controller to display an original display window in which selectable items, comments for the items, and a reference image display area are arranged;
acquisition means for acquiring, from the display controller, bitmap image data of a screen copy image of the currently displayed original display window;
reduction means for reducing the size of the bitmap image data acquired by said acquisition means; and
generation updating means for updating the displayed original window by arranging the image reduced by said reduction means within the reference image display area of the displayed original display window and drawing arrow lines connecting items in the reduced selectable items in the reduced image and comments in the displayed original display window.

6. An information processing apparatus which lays out selectable processing items in a display window, and executes a corresponding process when one of the processing items is designated by a predetermined instruction, the apparatus comprising:
a display unit adapted to display video output;
a display controller unit adapted to generate video signals that are provided to said display unit;
a window display unit adapted to control said display controller unit to display an original display window in which selectable items, comments for the items, and a reference image display area are arranged;
an acquisition unit adapted to acquire, from said display controller unit, bitmap image data of a screen copy image of the currently displayed original display window;
a reduction unit adapted to reduce the size of the bitmap image data acquired by said acquisition unit; and
a generation updating unit adapted to update the displayed original window by arranging the image reduced by said reduction unit within the reference image display area of the displayed original display window and draw arrow lines connecting items in the reduced selectable items in the reduced image and comments in the displayed original display window.

7. An image edit apparatus which displays an image in an editing window, and edits the displayed image by selecting a desired image process item, the apparatus comprising:
display means for displaying video output;
display controller means for generating video signals that are provided to said display means;
help window displaying means for, while an image to be edited is displayed in the editing window, if an instruction for displaying a help window for giving an explanation of a desired image processing is input, controlling said display controller means to display the help window in which a selection portion for selecting an image processing item among a plurality of image processing items, a comment display area and first and second image display areas are arranged, the help window being independent from the editing window;
acquisition means for, when the instruction is input, acquiring, from said display controller means, bitmap image data of a screen copy image of image data currently being displayed in the editing window;
detection means for detecting an image processing item, among the selectable image processing items in the displayed help window, designated by a user;
image processing means for performing the image processing, corresponding to the image processing item detected by said detection means, on the bitmap image acquired by said acquisition means without performing the image processing on the image data displayed within the edit window; and
updating means for updating the help window, by arranging comments related to the image processing item designated by the user within the comment display area of the displayed help window, arranging the acquired bitmap image as a pre-edit image within the first image display area of the displayed help window, and arranging a result obtained by said image processing means as a post-edit image within the second image display area of the displayed help window.

8. The apparatus according to claim 7, wherein, when the image processing of the processing item corresponding to the comment display request requires area designation, a predetermined area in the acquired bitmap image data displayed as the pre-edit image in the first image display area is automatically designated, and a line segment indicating the designated area is displayed in the first image display area.

9. The apparatus according to claim 7, wherein, when the instruction is input, and when no image to be edited is displayed in the edit window, a message that prompts a user to read an image to be edited is displayed.

10. A method of controlling an image edit apparatus having a display controller generating video signals provided to a display device which displays video on a screen, which displays an image, and which edits the displayed image by selecting a desired image process item, the method comprising:

a help window displaying step of, while an image to be edited is displayed in an editing window, if an instruction for displaying a help window for giving an explanation of a desired image processing is input, controlling the display controller to display the help window in which a selection portion for selecting an image processing item among a plurality of image processing items, a comment display area and first and second image display areas are arranged, the help window being independent from the editing window;

an acquisition step of acquiring, from the display controller, when it is the instruction is input, bitmap image data of a screen image of image data currently being displayed in the editing window;

a detection step of detecting an image processing item, among the selectable image processing items in the displayed help window, designated by a user;

an image processing step of performing the image processing, corresponding to the image processing item detected in said detection step, on the bitmap image data acquired in said acquisition step without performing the image processing on the image data displayed within the edit window; and an updating step of updating the help window, by arranging comments related to the image processing item designated by the user within the comment display area of the displayed help window, arranging the acquired bitmap image as a pre-edit image within the first image display area of the displayed help window, and arranging a result obtained in said image processing step as a post-edit image within the second image display area of the displayed help window.

11. A computer-readable storage medium storing a computer program, and executed by a computer serving as an image edit apparatus having a display controller generating video signals provided to a display device which displays video on a screen, and which displays an image and edits the displayed image by selecting a desired image process item when said program is loaded and executed, the computer program comprising:

help window displaying means for, while an image to be edited is displayed in the editing window, if an instruction for displaying a help window for giving an explanation of a desired image processing is input, controlling the display controller to display the help window in which a selection portion for selecting an image processing item among a plurality of image processing items, a comment display area and first and second image display areas are arranged, the help window being independent from the editing window;

acquisition means for, when the instruction is input, acquiring, from the display controller, bitmap image data of a screen copy image of image data currently being displayed in the editing window;

detection means for detecting an image processing item, among the selectable image processing items in the displayed help window, designated by a user;

image processing means for performing the image processing, corresponding to the image processing item detected by said detection means, on the bitmap image data acquired by said acquisition means without performing the image processing on the image data displayed within the edit window; and updating means for updating the help window, by arranging comments related to the image processing item designated by the user within the comment display area of the displayed help window, arranging the acquired bitmap image data as a pre-edit image within the first image display area of the displayed help window, and arranging a result obtained by said image processing means as a post-edit image within the second image display area of the displayed help window.

12. An image edit apparatus which displays an image in an editing window, and edits the displayed image by selecting a desired image process item, the apparatus comprising:

a display unit adapted to display video output;

a display controller unit adapted to generate video signals that are provided to said display unit;

a help window displaying unit adapted to, while an image to be edited is displayed in the editing window, if an instruction for displaying a help window for giving an explanation of a desired image processing is input, control said display controller unit to display the help window in which a selection portion for selecting an image processing item among a plurality of image processing items, a comment display area and first and second image display areas are arranged, the help window being independent from the editing window;

an acquisition unit adapted to, when the instruction is input, acquire, from said display controller unit, bitmap image data of a screen copy image of image data currently being displayed in the editing window;

a detection unit adapted to detect an image processing item, among the selectable image processing items in the displayed help window, designated by a user;

an image processing unit adapted to perform the image processing, corresponding to the image processing item detected by said detection unit, on the bitmap image acquired by said acquisition unit without performing the image processing on the image data displayed within the edit window; and an updating unit adapted to update the help window, by arranging comments related to the image processing item designated by the user within the comment display area of the displayed help window, arranging the acquired bitmap image as a pre-edit image within the first image display area of the displayed help window, and arranging a result obtained by said image processing unit as a post-edit image within the second image display area of the displayed help window.

* * * * *